(12) United States Patent
Toro

(10) Patent No.: US 9,630,731 B2
(45) Date of Patent: Apr. 25, 2017

(54) APPARATUS FOR SORTING OBJECTS

(71) Applicant: SYSTEM S.P.A., Fiorano Modenese (Modena) (IT)

(72) Inventor: Andrea Toro, Fiorano Modenese (IT)

(73) Assignee: SYSTEM S.P.A., Fiorano Modenese (IT)

( * ) Notice: Subject to any disclaimer, the term of this patent is extended or adjusted under 35 U.S.C. 154(b) by 111 days.

(21) Appl. No.: 14/647,567

(22) PCT Filed: Nov. 22, 2013

(86) PCT No.: PCT/IB2013/060331
§ 371 (c)(1),
(2) Date: May 27, 2015

(87) PCT Pub. No.: WO2014/097018
PCT Pub. Date: Jun. 26, 2014

(65) Prior Publication Data
US 2015/0298840 A1 Oct. 22, 2015

(30) Foreign Application Priority Data

Dec. 17, 2012 (IT) .............................. MO2012A0307

(51) Int. Cl.
*B65H 29/32* (2006.01)
*B65B 35/50* (2006.01)
(Continued)

(52) U.S. Cl.
CPC ........... *B65B 35/50* (2013.01); *B25J 15/0616* (2013.01); *B65B 59/00* (2013.01); *B65G 57/03* (2013.01);
(Continued)

(58) Field of Classification Search
CPC ......... B65B 23/20; B65B 35/38; B65B 35/50; B65G 49/061; B65G 57/03; B65G 57/04;
(Continued)

(56) References Cited

U.S. PATENT DOCUMENTS 3,680,677 A * 8/1972 Branch ................ B65G 17/323
198/369.6
3,724,640 A * 4/1973 Rapparlie .............. B65H 31/28
271/213

(Continued)

FOREIGN PATENT DOCUMENTS

DE     3432284 A1    3/1986
EP     0242588 A2   10/1987
(Continued)

*Primary Examiner* — Mark Beauchaine
(74) *Attorney, Agent, or Firm* — Pearne & Gordon LLP

(57) ABSTRACT

An apparatus for sorting objects conveyed by a conveying line, comprises a portion of conveying line (2) at which the objects (3) are sorted, a plurality of gripping means (4) for gripping the objects (3) operating at a portion of conveying line (2). The gripping means (4), on command and selectively, pick up the objects present on the portion of conveying line (2) and transfer them onto supports (5) in temporary waiting areas preselected for forming stacks of objects (3) homogeneous with each other. Lifting and conveying means (6) are provided for lifting, on command, single objects or stacks of objects (3) resting on supports (5) in preselected temporary waiting areas and conveying them onto an evacuation line (7).

10 Claims, 5 Drawing Sheets

(51) Int. Cl.
*B25J 15/06* (2006.01)
*B65G 61/00* (2006.01)
*B65B 59/00* (2006.01)
*B65G 57/03* (2006.01)
*B65G 57/04* (2006.01)
*B65B 23/20* (2006.01)

(52) U.S. Cl.
CPC ............ *B65G 57/04* (2013.01); *B65G 61/00* (2013.01); *B65B 23/20* (2013.01)

(58) Field of Classification Search
CPC .... B65H 29/241; B65H 29/32; B25J 15/0616; B23P 19/007
USPC .......................................................... 414/793
See application file for complete search history.

(56) References Cited

U.S. PATENT DOCUMENTS 8,006,824 B2 8/2011 Wada et al.
2010/0042249 A1 2/2010 Wada et al.

FOREIGN PATENT DOCUMENTS

| EP | 2088097 A1 | 8/2009 |
| FR | 2725430 A1 | 4/1996 |
| WO | 2008038081 A1 | 4/2008 |
| WO | 2010035153 A1 | 4/2010 |

\* cited by examiner

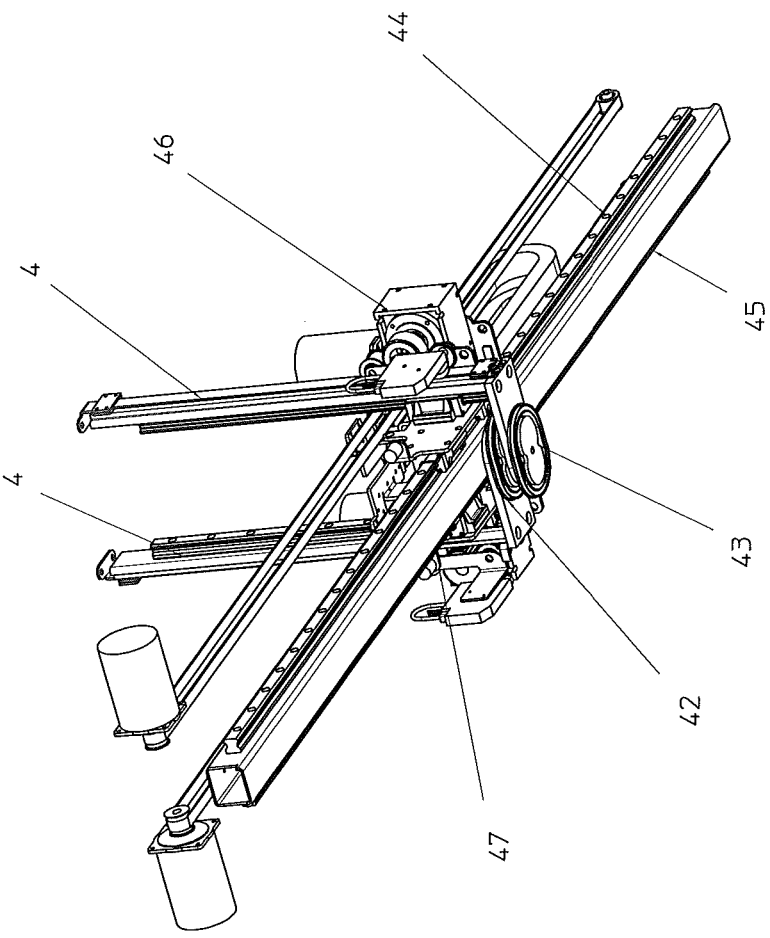

APPARATUS FOR SORTING OBJECTS

The subject of the present invention is an apparatus for sorting objects.

Specifically, but not exclusively, it finds useful application in packing lines, where objects coming from a continuous conveying line, along which they are essentially transferred in a row and generally spaced apart from one another, must be "sorted", i.e. separated from one another on the basis of the characteristics of each one which have been determined before the sorting. The "sorting" performs the essential function of separating the objects coming from the line on the basis of the corresponding characteristics so as to make it possible subsequently to collect together objects which are the same by homogeneity of characteristics, so as to form, as for example in the case of tiles or slabs (ceramic or of other kind) homogeneous packs composed of a pre-established number of objects. These packs of homogeneous objects are thus ready for the next stage of packing.

Apparatuses are known which perform a similar function in a line, in particular for objects consisting of tiles or slabs. For example, one of such known apparatuses is shown in publication WO2008/038081 in the name of the same applicant in which the same apparatus is identifiable as a portion of a more complex packing line. In the specific case, picking up the tiles, with which the stacks must be formed to be later packed on pallets, is performed by picking up identical tiles by means of two sets of pincers from a loading station, at which the tiles are halted and positioned against a stop. Alternatively these pincers are positioned on the station; they pick up and transfer the tiles, setting them down to form contiguous stacks on a support structure. The same pincers are then responsible for transferring the stacks, once formed, to a packaging station for the packs.

The principal drawbacks and disadvantages of the explained apparatus can be ascribed to a certain complexity which characterises it, to its not inconsiderable bulk and to a certain "heaviness" of the structural apparatus used to support and move the pincers which must also be suitable for moving stacks of tiles or slabs. To this must be added the fact that this apparatus is constitutionally incapable of sustaining the normal rhythm of work required for selection and packing lines.

Furthermore, in the specific case, the apparatus is essentially suitable for large formats.

In other embodiments which use sucker cup systems for picking up the tiles from one point on the line and then depositing said tiles on a stack of tiles being formed, slow speeds of execution are encountered in any event. Sorting lines for ceramic tiles of medium to small formats use a conveyor employing belts operating laterally on the tiles and special actuators and extractors to release individual tiles from the belts. Drawbacks due to such systems are imputable to irregularity in sizing the tiles, which does not allow them to be safely conveyed, to the modalities of extracting the tiles and to the laboriousness of changing format.

The present invention aims to obviate the drawbacks of the known art according to what is described, illustrated and claimed below.

In particular the present invention makes it possible to achieve the result of not needing adaptations or adjustments for so-called changes of format. Indeed, it makes it possible to operate on the same line on different formats.

Other advantages are traceable to the fact that the formation of the stacks occurs at the sides of the conveying line, on fixed and "universal" bases in the sense that they are capable of accommodating stacks of different formats in process of formation.

A further advantage of the invention consists in the fact that the entire device for evacuating the stacks operates in the lower part of the sorter without substantially interfering with the incoming objects to be stacked and with the formation of the stacks themselves.

Further characteristics and advantages of the present invention will appear more clearly from the detailed description which follows of a preferred, but not exclusive embodiment, illustrated below by way of non-limiting example in the attached drawings, in which:

FIG. 5 shows, on an enlarged scale, a detail of FIG. 2;

FIG. 6 shows, on an enlarged scale, a perspective view of a movement group for two gripping means.

Figure 1:
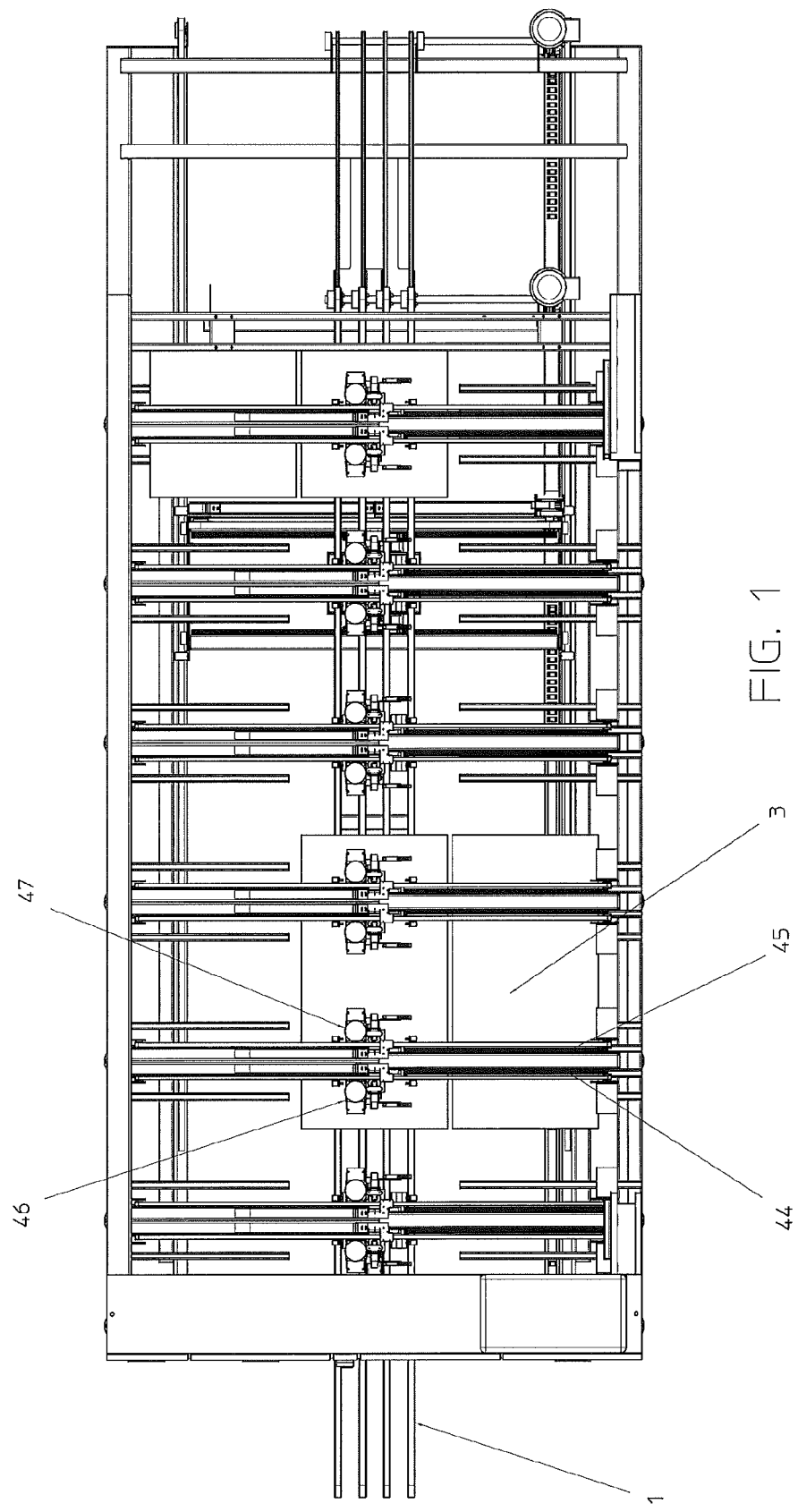
FIG. 1 shows a schematic plan view thereof from above.
Figure 2:
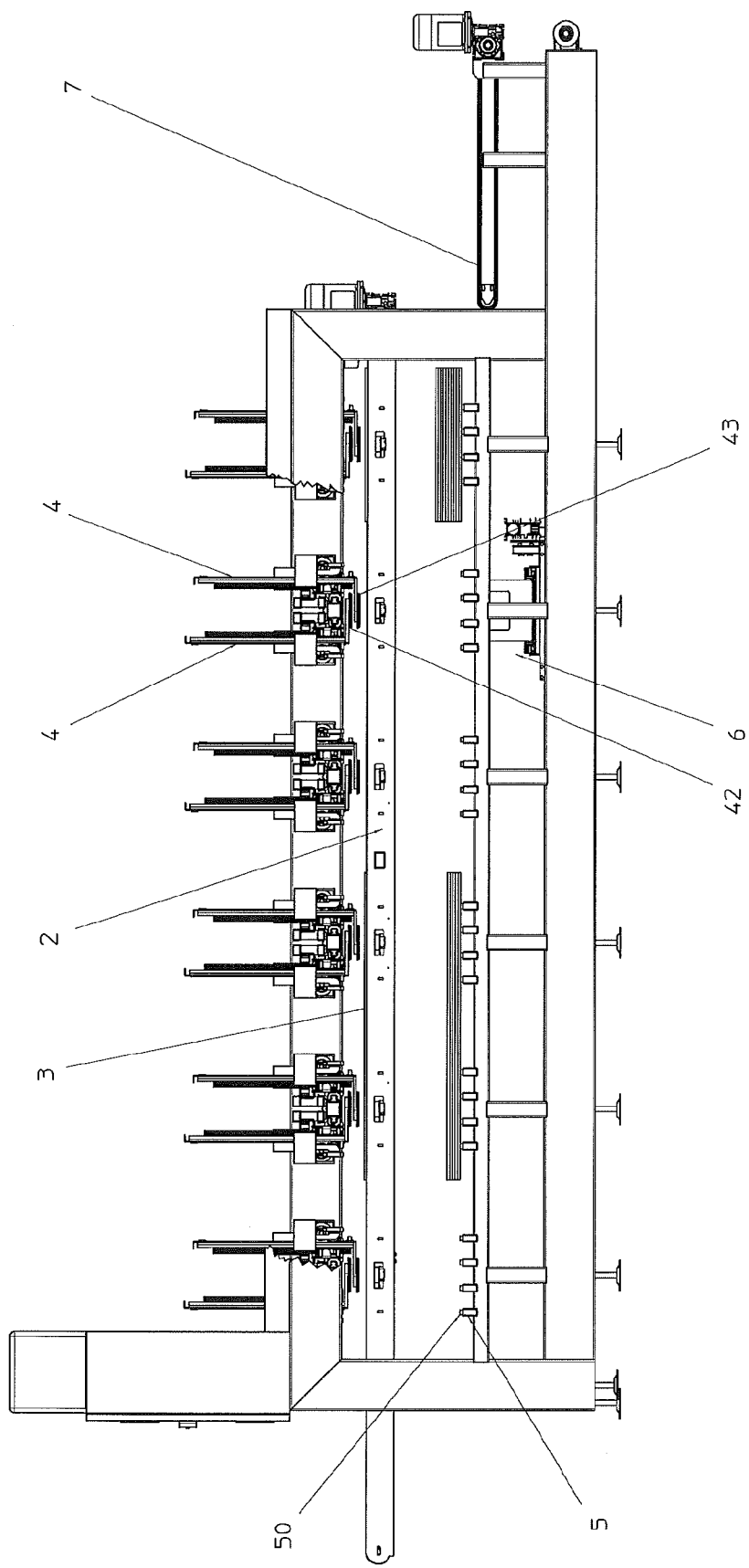
FIG. 2 shows a schematic section executed according to the tracing plane II-II of FIG. 1.
Figure 3:
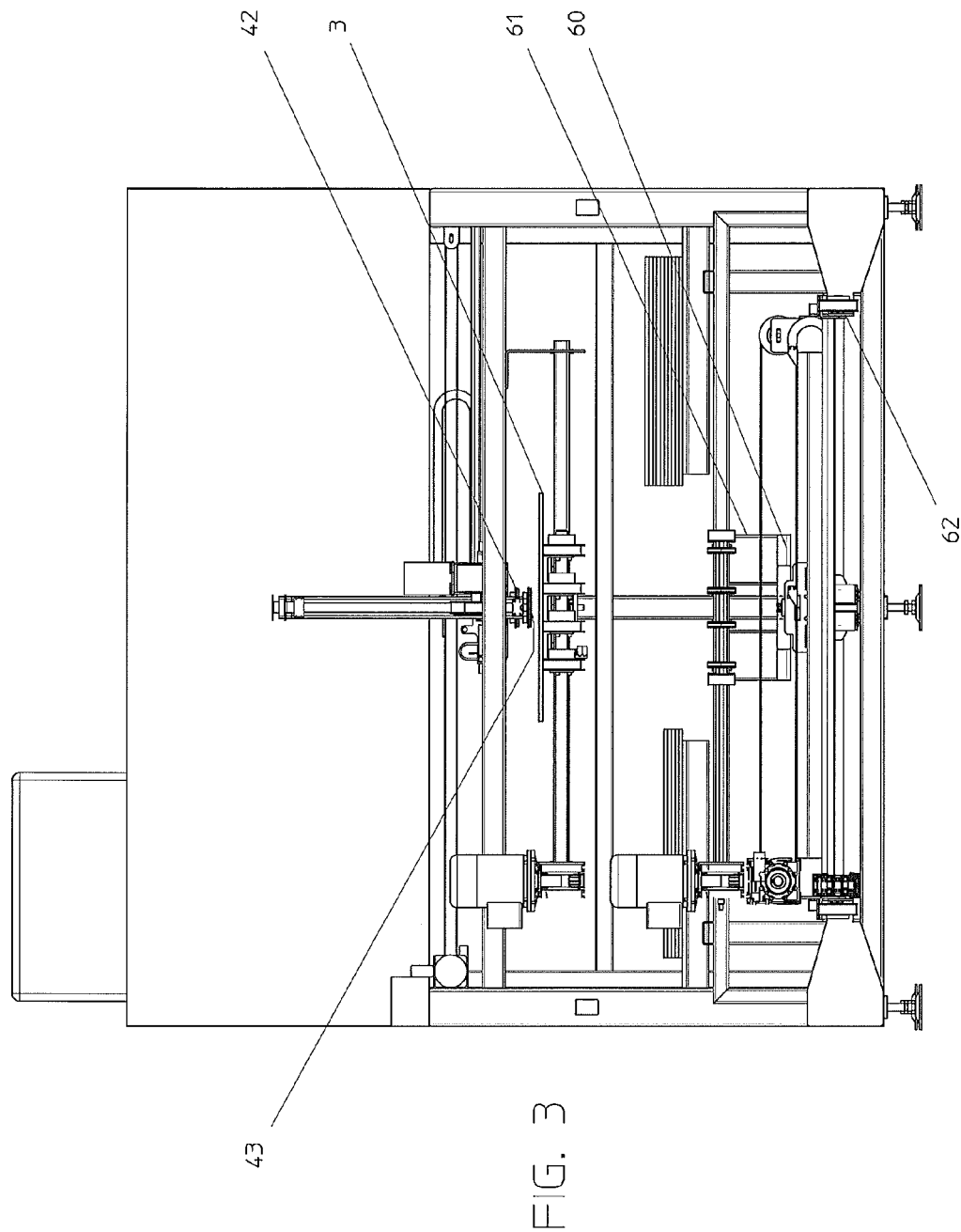
FIG. 3 shows, on an enlarged scale, a schematic side view from the left of FIG. 2, partially sectioned, with some parts removed to better show others.
Figure 4:
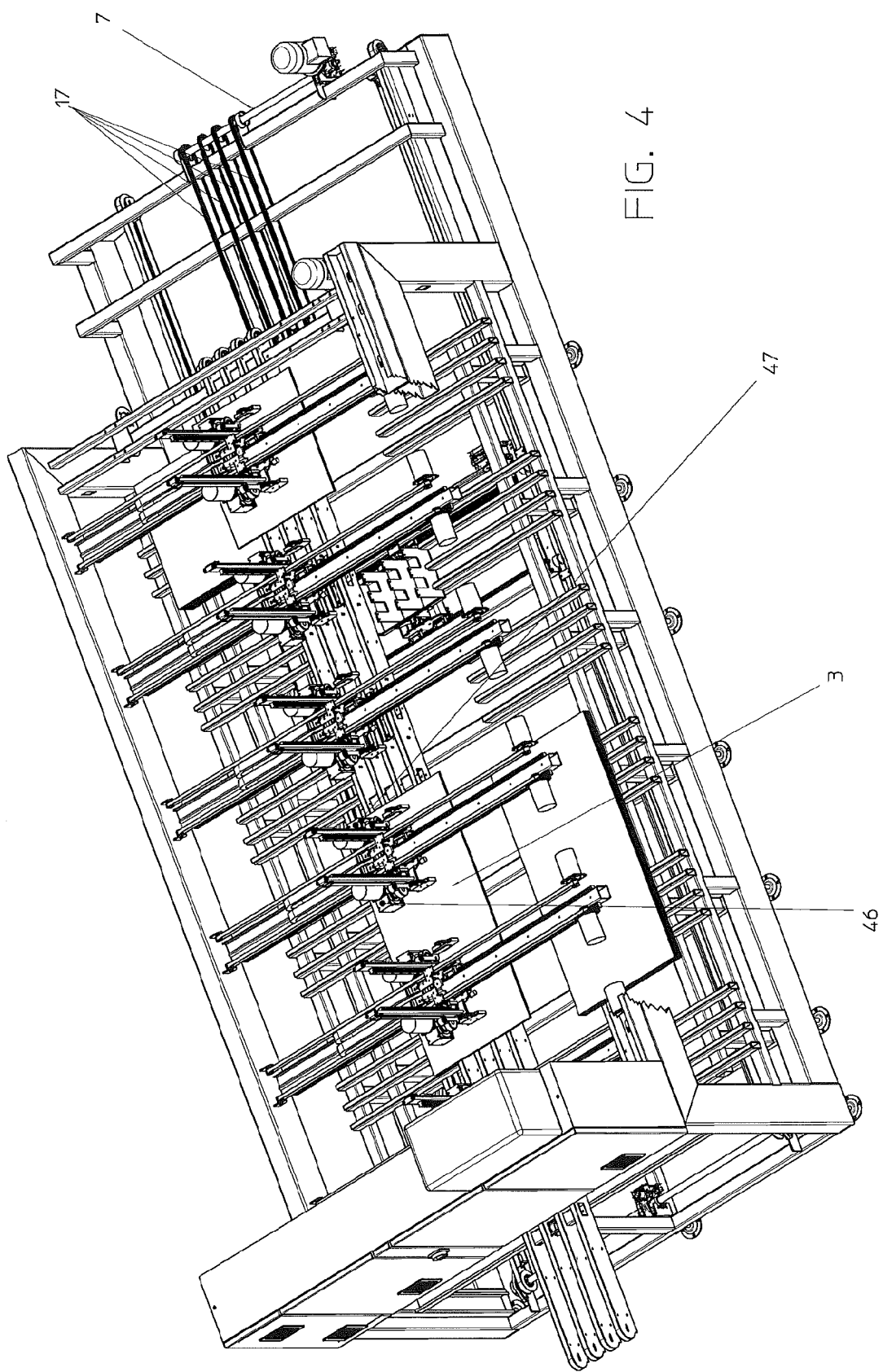
FIG. 4 shows a schematic representation in perspective of the apparatus, partially sectioned, with some parts removed to better show others.

In the aforementioned drawings, an apparatus for sorting objects is shown, which performs essentially the function of separating the objects 3 coming from a continuous conveying line 1, along which they are conveyed, ordered in a row and appropriately spaced apart from each other.

The objects 3 are distinguishable from each other on the basis of various characteristics so as to make it possible later to collect them together by groups characterised by homogeneity of characteristics.

In the embodiment illustrated the objects have the form of slabs or tiles (ceramic or of other kind) which are "sorted" so as to be regrouped to form packs of homogeneous objects.

In the specific case, homogeneity is essentially determined by the format.

The apparatus is furthermore usable for sorting objects of any type which have a form which may or may not be flat but can however be picked up with suction cups and is suitable for stacking the objects themselves.

The apparatus accommodates the objects 3 conveyed by the conveying line 1 and comprises its own portion of conveying line 2 on which the actual sorting of the objects 3 is performed.

A plurality of gripping means 4 for the objects 3 are provided for operating on the portion of conveying line 2.

These gripping means 4, on command and selectively, pick up the objects 3 on the portion of conveying line 2 and transfer them onto supports 5 in temporary waiting areas to form stacks of objects 3 homogeneous with each other. In the embodiment illustrated, supports 5 are provided on both sides of the portion of conveying line 2. The temporary waiting areas generated by said supports 5 are located below said portion of conveying line 2.

The temporary waiting areas are identified on each occasion on the supports 5 for forming the individual stacks. An appropriate steering and control system is responsible for identifying the objects 3 which are homogeneous with each other, and commanding them to be selectively picked up from the portion of conveying line 2 and then arranging for them to be stacked in one of said temporary waiting areas which happens to be free. In this sense there are no pre-established temporary waiting areas for accommodating objects 3 of different formats.

Lifting and conveying means 6 are provided for lifting, on command, (single objects or) stacks of objects 3 previously resting on supports 5 in the relative temporary waiting areas and conveying them onto an evacuation line 7.

The gripping means 4 for said plurality, which are distributed along said portion of conveying line 2, are operable singly or in groups in synchronised manner on the basis of the dimensions of the objects 3 to be picked up and conveyed. In other words these gripping means are activated singly when the format of the objects 3 on which to operate are small, while they are activated in groups (composed of two or more gripping means) in synchronised manner when the format of the objects 3 is larger.

The gripping means 4 are operated in synchronised manner in a group so as to "centre" the objects 3 which are gripped.

In particular the gripping means 4 of said plurality operate over said portion of conveying line 2, and said objects 3 present thereon are gripped by means of the upper surfaces of the objects 3 themselves.

The supports 5, suitable for defining said temporary waiting areas preselected for stacks of objects 3 homogeneous with each other, are vertical elements uniformly spaced apart from each other according to the direction of said portion of conveying line 2 and are suitable for defining with their upper ends 50 at least one supporting plane for each side of the line.

Each said supporting plane has the special characteristic of being located lower than the portion of conveying line 2.

In particular the upper ends 50 of the supports 5 define at least one supporting plane which is located below the portion of conveying line 2 at a pre-established distance therefrom which defines a free space or height in a vertical direction that is the maximum useful height for permitting the movement of the objects or stacks of objects (3) to be sorted. Or, to put it another way, the maximum height of stacks of objects 3 which can be sorted.

The gripping means 4 have the characteristic of exerting their grip over the upper surfaces of the objects 3 and are of suction pad type. They are mounted on movement groups 40, 41 for first and second suction cups 42, 43. These movement groups 40, 41 are movable and positionable on command along guides 44, 45 transverse to the direction of advancing motion of the objects 3 on the portion of conveying line 2 and, comprehensively along the sorter.

Members 46, 47 are provided for performing on command the vertical movements of the relative first and second suction cups 42, 43.

The system makes it possible to pick up single objects 3 using groups of gripping means 4 which are operated in synchronised manner, to transfer the picked-up objects onto the top of the stack in process of formation of identical objects and to deposit them, releasing them centred over the stack itself.

Thus the first part of the sorting operation is achieved, consisting in selecting objects homogeneous with each other and depositing them in homogeneous stacks in temporary waiting areas located at the sides of the line.

The stacks of homogeneous objects temporarily deposited on the supports 5 are then evacuated, on command, without interfering with the operation of forming homogeneous stacks, by means of a device, located lower down, which comprises said lifting and conveying means 6 which act, on command, to lift stacks of objects (or in some cases single objects) 3 resting on the supports 5 in the preselected temporary waiting areas, and transfer them to an evacuation line 7.

These lifting and conveying means 6 comprise a lifting device 60 equipped with a plurality of conveying supports 61 positioned for being inserted between the supports 5 with the possibility of movement with respect to them at least in a direction transverse to the direction of movement of said portion of conveying line and of the evacuation line, and are movable in a vertical direction between a position lower than the supporting plane defined by the upper ends of the supports 5 and a position higher than the said supporting plane and vice versa.

The lifting device 60 is commanded to translate on command in a direction transverse to the direction of movement of the portion of conveying line 2 and is connected to a carriage 62 that is commanded to translate in a direction parallel to the direction of movement of said portion of conveying line 2 as far as the evacuation line 7 which has a direction of evacuation movement parallel to the direction of movement of the carriage 61.

More specifically, the evacuation line 7 consists of a parallel belt conveyor 17 in which the transverse distance between belts 17 is free. The mutual positioning of the belts themselves enables free insertion in the direction of conveyor movement of the conveying supports 61.

The structure and the operating configuration of the invention have a great overall simplicity and enable a high degree of elasticity of operation without requiring stackers.

The stacks in course of formation are located at the sides of the sorting line itself. This makes it possible among other things to create a sorting apparatus which is extremely compact and flexible.

Furthermore, the high speed of working and the structural independence between the formation of the stacks of homogeneous objects and the evacuation of the stacks themselves makes it possible to combine in line the usual speeds of picking and packing lines for ceramic tiles.

It should also be observed that the invention is usable for all those products of flat form which can be gripped by the relative upward-facing surfaces.

The invention claimed is:

1. Apparatus for sorting objects conveyed by a conveying line, comprising:
    a portion of conveying line (2) at which said objects (3) are sorted,
    a plurality of gripping means (4) for gripping said objects (3) operating at said portion of conveying line (2), said gripping means (4) being suitable for picking up, on command, the objects present on the portion of conveying line (2), to transfer the objects on supports (5) in pre-chosen temporary waiting areas for forming stacks of homogeneous objects (3);
    lifting and conveying means (6) suitable for lifting, upon command, single objects or stacks of objects (3) resting on supports (5) in pre-chosen temporary waiting areas and transferring the objects to an evacuation line (7);
    wherein said gripping means (4) is of the suction cup type and is fitted to movement groups (40, 41) of first and second suction cups (42, 43), said movement groups (40, 41) being movable and positionable on command along guides (44, 45) that are transverse to the advancing motion of the objects (3) on the said portion of conveying line (2) and are provided with members (46, 47) that are suitable for moving vertically, upon command, the corresponding first and second suction cups (42, 43).

2. Apparatus according to claim 1, characterised in that the gripping means (4) of the said plurality, distributed along said portion of conveying line (2), are drivable singularly or in groups in a synchronous manner depending on the dimensions of the objects (3) to be picked up and transferred.

3. Apparatus according to claim 1, characterised in that the gripping means (4) of said plurality operates above said portion of conveying line (2) and that gripping said objects (3) that are present thereupon is performed by using the upper surfaces of the objects (3) themselves.

4. Apparatus according to claim 1, characterised in that the said supports (5), which are suitable for defining said pre-chosen temporary waiting areas for stacks of homogeneous objects (3), are vertical elements that are uniformly spaced apart from one another according to the direction of the said portion of conveying line (2) and the upper ends (50) of which are suitable for defining at least one supporting plane.

5. Apparatus according to claim 4, characterised in that the said upper ends (50) of said supports (5) define at least one supporting plane that is located below said portion of conveying line (2).

6. Apparatus according to claim 5, characterised in that the upper ends (50) of the supports (5) define at least one supporting plane that is located below said portion of conveying line (2) and at a preset distance therefrom that defines a free space in a vertical direction that is the maximum useful height for permitting the objects or stacks of objects (3) to be sorted to be moved.

7. Apparatus according to claim 1, characterised in that said lifting and conveying means (6) that is suitable, on command, for lifting single objects or stacks of objects (3) resting on supports (5) in pre-chosen temporary waiting areas and transferring the objects to an evacuation line (7) comprises a lifting device (60) provided with a plurality of conveying supports (61) positioned for being inserted between the supports (5) with the possibility of movement in relation thereto at least in a direction that is transverse to the motion direction of the said portion of conveying line (2) and is movable in a vertical direction between a position below the supporting plane defined by the upper ends of the supports (5) and a position above the supporting plane; said lifting device (60) being commanded to translate upon command in a direction that is transverse to the motion direction of said portion of conveying line (2) and being connected to a carriage (62) that is constrained to translate in a direction parallel to the motion direction of said portion of conveying line (2) as far as said evacuation line (7).

8. Apparatus according to claim 7, characterised in that the said evacuation line (7) has a motion direction parallel to the motion direction of the said carriage (61).

9. Apparatus according to claim 8, characterised in that the said evacuation line (7) consists of a parallel belt conveyor (17); it being provided for that the transverse distance between said belts (17) and the mutual positioning thereof enable said conveying supports (61) to be freely inserted into the direction of the conveying motion of said conveying supports (61).

10. Apparatus according to claim 7, characterised in that it comprises on both sides of the said portion of conveying line (2) as far as said evacuation line (7) a plurality of supports (5), each of which defines pre-chosen temporary waiting areas for forming stacks of homogeneous objects (3).

* * * * *